United States Patent
Foster et al.

(10) Patent No.: US 7,461,400 B2
(45) Date of Patent: Dec. 2, 2008

(54) METHODS, SYSTEMS, AND COMPUTER PROGRAM PRODUCTS FOR PROVIDING AUTHENTICATION IN A COMPUTER ENVIRONMENT

(75) Inventors: David Foster, Pinson, AL (US); Suriya Sena, Birmingham, AL (US)

(73) Assignee: AT&T Intellectual Property, I,L.P., Wilmington, DE (US)

( * ) Notice: Subject to any disclaimer, the term of this patent is extended or adjusted under 35 U.S.C. 154(b) by 812 days.

(21) Appl. No.: 11/022,257

(22) Filed: Dec. 22, 2004

(65) Prior Publication Data
US 2006/0137001 A1 Jun. 22, 2006

(51) Int. Cl.
H04L 9/32 (2006.01)
(52) U.S. Cl. ............... 726/10; 726/2; 726/8; 726/9; 709/220; 709/230; 709/232; 709/238
(58) Field of Classification Search ............ 726/2, 726/8–10; 713/170; 709/217, 229, 220, 709/230, 232, 238
See application file for complete search history.

(56) References Cited

U.S. PATENT DOCUMENTS

| 2004/0128392 A1* | 7/2004 | Blakley et al. ............ 709/229 |
| 2005/0160153 A1* | 7/2005 | Knutson et al. ............ 709/217 |

* cited by examiner

Primary Examiner—Thanhnga B Truong
(74) Attorney, Agent, or Firm—Cantor Colburn LLP

(57) ABSTRACT

Exemplary embodiments relate to methods, systems, and computer program products for providing authentication in a computer environment. The method includes receiving a request for a web service from a client. The request is received at a J2EE based application server hosting one or more applications. The request includes a Kerberos security token and a Kerberos service ticket. Each application has its own Kerberos identity. It is verified that the client has access to the web service using the Kerberos security token and Kerberos service ticket as input to the verifying. The client is provided a connection to the web service if the verifying results in a determination that the client has access to the web service.

16 Claims, 3 Drawing Sheets

METHODS, SYSTEMS, AND COMPUTER PROGRAM PRODUCTS FOR PROVIDING AUTHENTICATION IN A COMPUTER ENVIRONMENT

BACKGROUND OF THE INVENTION

Exemplary embodiments relate generally to providing authentication in a computer environment, and more particularly, to methods, systems and computer program products for providing Kerberos authentication in a computer environment.

Using the Internet to transmit data requires security in order to prevent unauthorized use of data and/or applications. Because tools to "sniff" passwords off the network are in common use by system crackers, applications that send unencrypted passwords over the network are vulnerable to security breaches. Other client/server applications rely on the client program to be "honest" about the identity of the user who is using it. Still other applications rely on the client to restrict its activities to those that it is allowed to do, with no enforcement by the server.

Some sites attempt to use firewalls to solve network security problems. This approach assumes that the "bad guys" are on the outside, which may not always be the case. Firewalls also have the disadvantage in that they restrict how users can utilize the Internet. These restrictions may not be realistic and/or acceptable to users of the system.

Network security may also be addressed by using a tool such as Kerberos. Kerberos is a network authentication protocol developed at Massachusetts Institute Technology (MIT) to allow users and services to authenticate themselves to each other. Kerberos is designed to provide strong authentication for client/server applications by using secret-key cryptography. A free implementation of Kerberos is available from MIT. Kerberos is also available as a professionally supported product from several different vendors. The Kerberos protocol uses cryptography so that a client can prove its identity to a server (and vice versa) across an insecure network connection. After a client and server have used Kerberos to prove their identity, they can encrypt and/or digitally sign all of their communications to assure privacy and data integrity as they interact.

WebLogic Server (WLS) from BEA System, Incorporated includes an application infrastructure for developing, integrating, securing and managing distributed service-oriented applications. WLS is a standards based application server providing a foundation on which an enterprise can build its client/server applications. It may be utilized to support application development and application deployment including integrating enterprise systems and databases, delivering services and collaborating over the Internet.

In many cases clients are authenticated to Kerberos during client start up and Kerberos authentication is utilized to provide security between the client and services invoked by the client. WLS, as currently implemented, does not support an interface to Kerberos and therefore Kerberos cannot be utilized to provide security between the client and WLS. The ability to utilize Kerberos to provide security between a client and WLS would be desirable.

SUMMARY OF THE INVENTION

Exemplary embodiments relate to methods, systems, and computer program products for providing authentication in a computer environment. Methods include a request for a web service from a client. The request is received at a J2EE based application server hosting one or more applications. The request includes a Kerberos security token and a Kerberos service ticket. Each application has its own Kerberos identity. It is verified that the client has access to the web service using the Kerberos security token and Kerberos service ticket as input to the verifying. The client is provided a connection to the web service if the verifying results in a determination that the client has access to the web service.

Systems for providing authentication in a computer environment include a J2EE based application server hosting one or more applications. The J2EE based application server includes an input for receiving a request for a web service from a client. The request includes a Kerberos security token and a Kerberos service ticket. Each application has its own Kerberos identity. The system also includes instructions for verifying that the client has access to the web service using the Kerberos security token and Kerberos service ticket as input to the verifying. The client is provided a connection to the web service if it is determined that the client has access to the web service.

Computer program products for providing authentication in a computer environment include a storage medium readable by a processing circuit and storing instructions for execution by the processing circuit for facilitating a method. The method includes a request for a web service from a client. The request is received at a J2EE based application server hosting one or more applications. The request includes a Kerberos security token and a Kerberos service ticket. Each application has its own Kerberos identity. It is verified that the client has access to the web service using the Kerberos security token and Kerberos service ticket as input to the verifying. The client is provided a connection to the web service if the verifying results in a determination that the client has access to the web service.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims. A user device for providing metadata includes an input for receiving a notification that an item in a repository has been modified. The user device also includes an output for communicating the notification to a user via the user device.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

In accordance with exemplary embodiments, a Kerberos plug-in component is added to a BEA WLS application server in order to provide Kerberos authentication for web services. By utilizing the Kerberos plug-in component, Kerberbos authentication may be utilized to provide security between a client and a web service located within the WLS. In exemplary embodiments, the Kerberos authentication mechanism is based on Java generic security service-application programming interface (GSS-API), BEA WLS security APIs (security service provider interface "SSPI"), Java 2 Enterprise Edition (J2EE) enterprise Java beans (EJBs) and the Java API for XML-remote procedure call (JAX-RPC).

As used herein, the term Kerberos principal refers to the identity of a user to a Kerberos realm (e.g., "mybilling@mykerberos.realm"). A Kerberos key distribution center (KDC) refers to a Kerberos server responsible for issuing Kerberos tickets. A ticket granting ticket as used herein refers to a Kerberos ticket that allows a requestor to obtain tickets for services. A service ticket is a Kerberos ticket issued to a specific user for a specific service for a limited period of time (e.g., eight hours) that allows the service to authenticate a user. In addition, Java authentication and authorization service (JAAS) is the Java security API that the BEA WLS security framework is based on.

In JAAS, a subject is a class that represents the identity of a user or computing service (e.g., a person and a web application). In JAAS, a principal is a class that represents the identity of a user or computing service to a specific authentication technology. A subject may have one or more principles. For example, a user may have both (and probably different) Unix login names and Windows login names. GSS-API is an API specification RFC 1964, RFC 2743, defined by the Internet engineering task force (IETF), that provides a high level interface to different underlying security mechanisms. JGSS is an API specification for a Java implementation of the GSS-API RFC 2853. Both the Sun and IBM implementations of JGSS provide support for the Kerberos V5 security mechanism. SSPI is a BEA proprietary API that allows third party developers to write security modules and plug them into BEA WLS. An identify asserter is a security module in SSPI that accepts a security token as input, verifies the authenticity of the token, and if successful derives the token owner's identity from it.

Figure 1:
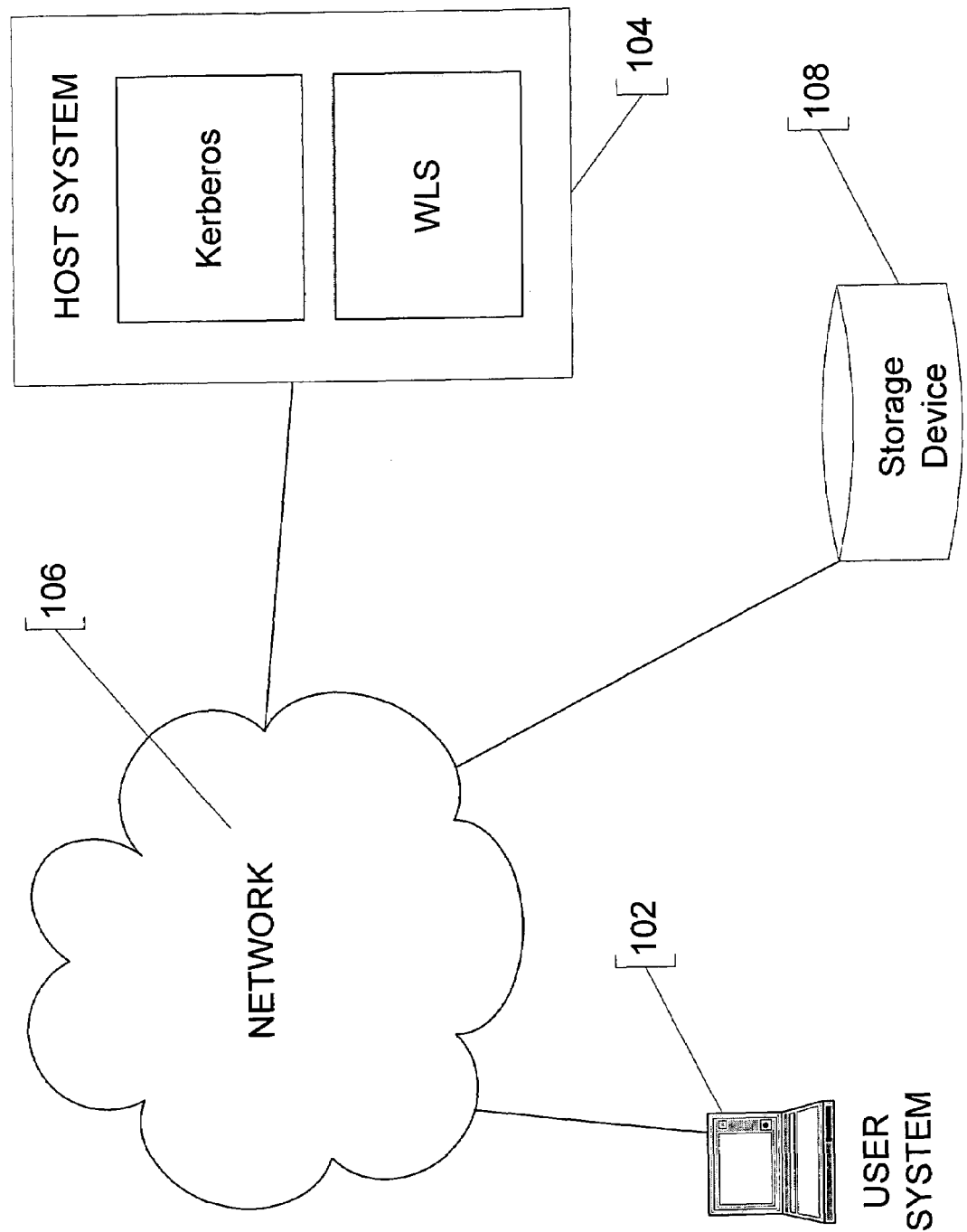
FIG. 1 is a block diagram of a system that may be utilized to provide authentication in a computer environment in accordance with exemplary embodiments.

FIG. 1 is a block diagram of a system that may be utilized to provide authentication in a computer environment in accordance with exemplary embodiments. The system includes one or more user systems 102 with web service clients through which users at one or more geographic locations may contact the host system 104 to access web service applications. In exemplary embodiments of the present invention, the host system 104 executes the WLS and the Kerberos KDC. The user systems 102 are coupled to the host system 104 via a network 106. Each user system 102 may be implemented using a general-purpose computer executing a computer program for carrying out the processes described herein. The user systems 102 may be personal computers (e.g., a lap top, a personal digital assistant) or host attached terminals. If the user systems 102 are personal computers, the processing described herein may be shared by a user system 102 and the host system 104 (e.g., by providing an applet to the user system 102) or contained completely within one or more of the user systems 102.

The network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation. A user system 102 may be coupled to the host system through multiple networks (e.g., intranet and Internet) so that not all user systems 102 are coupled to the host system 104 through the same network. One or more of the user systems 102 and the host system 104 may be connected to the network 106 in a wireless fashion.

The storage device 108 may be implemented using a variety of devices for storing electronic information. It is understood that the storage device 108 may be implemented using memory contained in the host system 104 or the user system 102 or it may be a separate physical device. The storage device 108 is logically addressable as a consolidated data source across a distributed environment that includes a network 106. Information stored in the storage device 108 may be retrieved and manipulated via the host system 104. The storage device 108 includes data such as the Kerberos KDC data and data storage for the web service applications. The storage device 108 may also include other kinds of data such as information concerning the updating and creation of the Kerberos service tickets and security tokens. In exemplary embodiments, the host system 104 operates as a database server and coordinates access to application data including data stored on storage device 108.

The host system 104 depicted in FIG. 1 may be implemented using one or more servers operating in response to a computer program stored in a storage medium accessible by the server. The host system 104 may operate as a network server (e.g., a web server) to communicate with the user system 102. The host system 104 handles sending and receiving information to and from the user system 102 and can perform associated tasks. The host system 104 may also include a firewall to prevent unauthorized access to the host system 104 and enforce any limitations on authorized access. For instance, an administrator may have access to the entire system and have authority to modify portions of the system. A firewall may be implemented using conventional hardware and/or software.

The host system 104 may also operate as an application server. The host system 104 executes one or more computer programs to implement web services (e.g., WLS). Processing may be shared by the user system 102 and the host system 104 by providing an application (e.g., java applet) to the user system 102. Alternatively, the user system 102 may include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Figure 2:
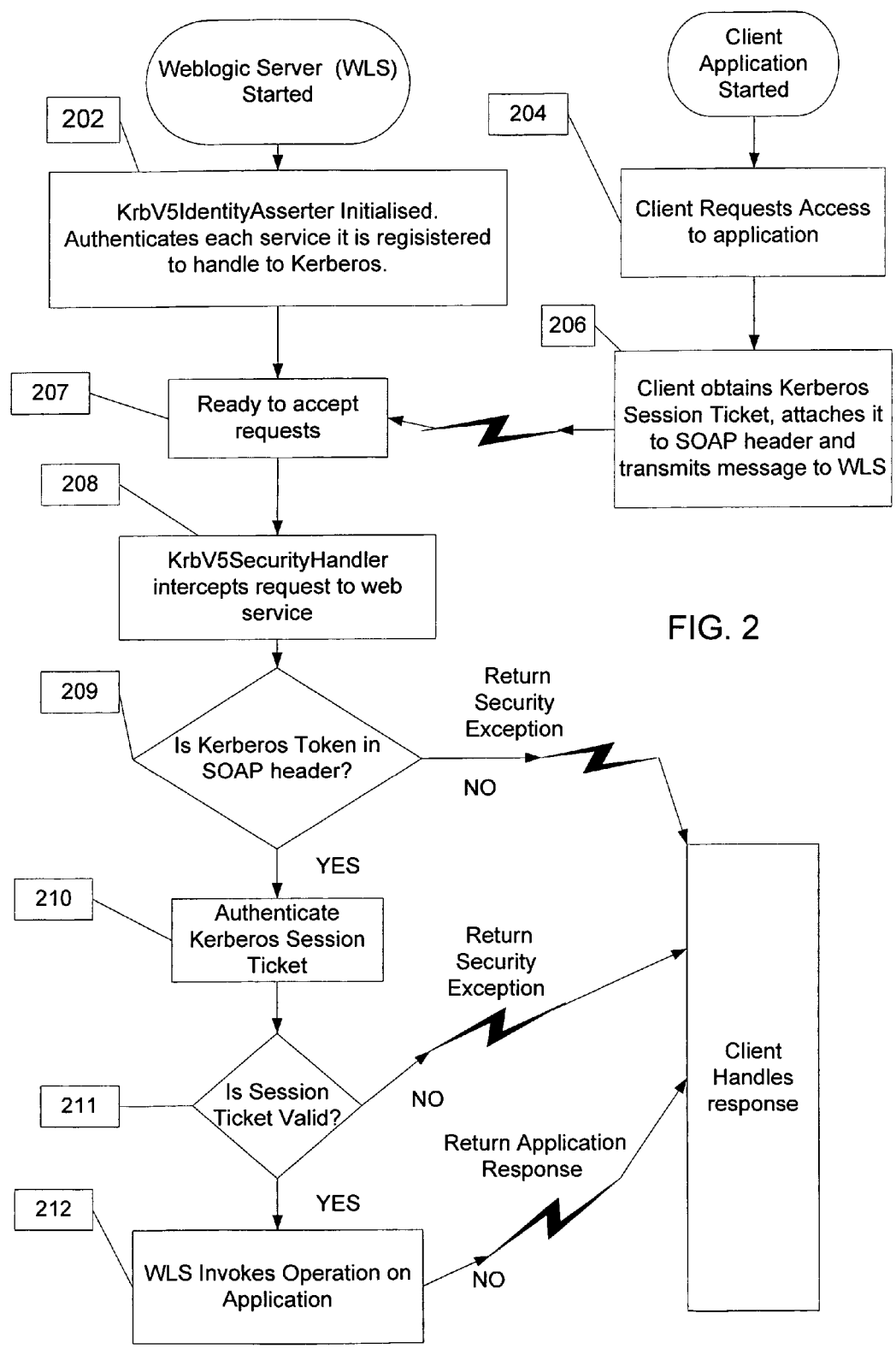
FIG. 2 is a flow diagram of an exemplary process for providing authentication in a computer environment.
Figure 3:
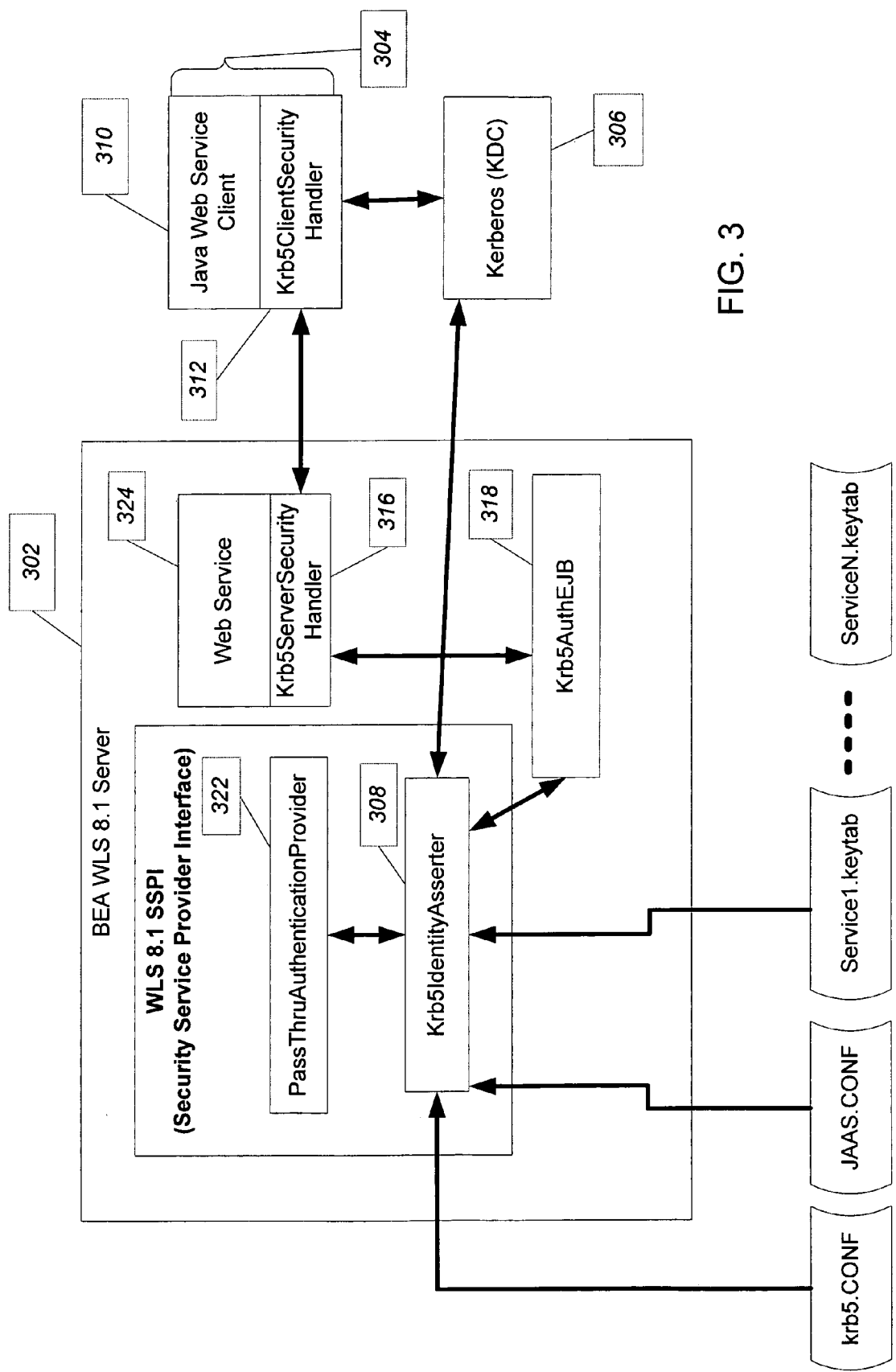
FIG. 3 is a block diagram of a server system, a client and a Kerberized service in accordance with exemplary embodiments.

FIG. 2 is a flow diagram of an exemplary process for providing authentication in a computer environment. FIG. 3 is a block diagram of a server system, a client and a Kerberized service in accordance with exemplary embodiments. FIG. 3 depicts a BEA WLS system 302 including a web service 324 and a WLS security service provider interface. FIG. 3 also includes a web service client 304 (including a Java web server client 310 and a Krb5ClientSecurityHandler 312) and a Kerberos key distribution center (KDC) 306. In exemplary embodiments, the BEA WLS 302 and KDC 306 are located on the host system 104, and the client 304 is located on the user system 102.

At block 202 in FIG. 2, the WLS 302 is initialized and authenticated to Kerberos. When the WLS 302 starts up it initializes each of the registered IdentityAsserters and calls their initialize methods. In the case of the Kerberos identify asserter in the "Krb5IdentityAsserter" box 308 in FIG. 3, the initialize method calls the JGSS API method createCredentials. CreateCredentials is called using the Kerberos principal and secret key supplied in the servers keytab file. The create- Credentials method causes a request to be made to the Kerberos KDC 306 authenticating the server. The Kerberos Identity Asserter may support multiple Kerberos identifiers allowing each web service to be secured individually. For example, if the WLS application server hosted both a billing web service and a purchasing web service each could have their own Kerberos identity, the billing webservice known to Kerberos as mybilling@mykerberos.realm and the purchasing webservice known as mypurchasing@mykerberos.realm. Client applications now have to obtain a session ticket for the particular service they wanted to use. For example a client wanting to use the billing service must send a session ticket for the mybilling@mykerberos.realm with each request. Exemplary JGSS code to accomplish this is as follows:

```
// The initialize method here has logging and exception handling
// removed for clarity.
public void initialize(ProviderMBean mbean, SecurityServices
services) {
//Initializes the GSSManager
manager = GSSManager.getInstance( );
Krb5IdentityAsserterMBean myMBean = (Krb5IdentityAsserterMBean)
      mbean;
description = myMBean.getDescription( ) + "\n" +
myMBean.getVersion( );
// The following lines retrieve parameters from the
// KerberosIdentityAsserter configuration.
// Retrieve the list of Kerberos principals that the Identity Asserter will
// authenticate with, each servicePrincipal is a string for example
// "mypurchasing@mykerberos.realm", "mybilling @mykerberos.realm"
String[] servicePrincipals = myMBean.getServicePrincipals( );
if (servicePrincipals == null || servicePrincipals.length == 0) {
String error =
"Krb5IdentityAsserter kerberos service principal list must be set";
log.error("Error: " + error);
throw new java.lang.SecurityException(error);
      }
// Retrieve the name of the krb5 config file and set java system
property.
// The krb5.conf file contains Kerberos configuration information
such as
// the IP Address of the kdc, etc
System.setProperty("java.security.krb5.conf",
      myMBean.getKrb5ConfigFile( ));
// Retrieve the name of the JAAS config file and set the java system
// property. The JAAS config file contains login parameters for the
// Kerberos login module, in the case of the Kerberos identity
asserter it
// will contain a section for each Kerberos principal, identifying the
// principal name, the login module and the parameters to the login
// module. For example
// mypurchasing$mykerberos.realm {
//    com.sun.security.auth.module.Krb5LoginModule required
//    storeKey=true principal="mypurchasing@mykerberos.realm"
//      useKeyTab = true keyTab="billing.keytab";
// };
System.setProperty("java.security.auth.login.config",
      myMBean.getJAASConfigFile( ));
System.setProperty("sun.security.krb5.debug",
      myMBean.isDebug( ).toString( ));
// The Kerberos Identity Asserter needs to keep track of each Kerberos
// principal and its associated credentials, so it creates a HashMap. Each
// entry in the hash map will be a GSSCredential identified 'keyed' by
// the Kerberos principal name it belongs to.
credentialMap = new HashMap(servicePrincipals.length);
// The Kerberos identity asserter now tries to 'login' each service
// principal to Kerberos using the parameters specified in the
jaas.conf and
// krb5.conf, if successful the an entry is created in Hashmap containing
// the GSSCredentials
try {
      for (int i = 0; i < servicePrincipals.length; i++) {
//@ symbol is not permitted in a jaas.conf file as a login context name
LoginContext lc = new LoginContext(servicePrincipals[i].replace('@',
'$'));
// authenticate the Subject
```

-continued

```
lc.login( );
// get the authenticated Subject
Subject subject = lc.getSubject( );
PrivilegedExceptionAction action = new
AquireGSSCredentialForServiceAction(servicePrincipals[i]);
GSSCredential credential =
    (GSSCredential) subject.doAs(subject,action);
credentialMap.put(servicePrincipals[i], credential);
}
      }
catch (java.security.PrivilegedActionException pe) {
      }
catch (LoginException le) {
      }
catch (Exception e) {
}
      }
// The AquireGSSCredentialForServiceAction class actually does the
// login to kerberos
class AquireGSSCredentialForServiceAction
implements java.security.PrivilegedExceptionAction {
private final String servicePrincipal;
public AquireGSSCredentialForServiceAction(String servicePrincipal) {
this.servicePrincipal = servicePrincipal;
      }
public Object run( ) throws GSSException {
Oid krb5Mechanism = new Oid("1.2.840.113554.1.2.2");
GSSName serverName = manager.createName(servicePrincipal, null);
GSSCredential credential = manager.createCredential(serverName,
GSSCredential.INDEFINITE_LIFETIME,
krb5Mechanism,
GSSCredential.ACCEPT_ONLY);
return credential;
      }
}
```

When the processing in block 202 is completed, WLS is ready to accept a request from a client, as described in block 207. At block 204 in FIG. 2, the client 304 starts up and requests access to an application on the WLS 302. At the Java web service client 310 on the client 304, a client application starts up and sets the service principal property to the Kerberos principal of the server that it wants to use. Then, the client 304 registers the Krb5ClientSecurityHandler 312 on the web service client 304 on the service endpoint and calls the method on the web services as usual. Exemplary code follows:

```
HashMap handlerConfig = new HashMap( );
    HandlerConfig.put("servicePrincipal",
"mybilling@mykerberos.realm");
    HandlerRegistry registry = service.getHandlerRegistry( );
    List handlerList = new ArrayList ( );
    handlerList.add(new HandlerInfo
    (com.abc.security.ws.KrbClientSecurityHandler.class,
    handlerConfig, null));
    registry.setHandlerChain(portName, handlerList)
    . . .
    Port.echo("hello");
```

At block 206 in FIG. 2, the client 304 creates a Kerberos security token and service ticket and transmits them to the WLS 302. To perform the processing in block 206, the Krb5ClientSecurity Handler 312 in the client 304 intercepts the outbound simple object access protocol (SOAP) request from the Java web service client 310. SOAP is an industry standard specification that defines a message format and rules for passing the messages that is utilized by the Java web service client 310. The Krb5ClientSecurityHandler 312 has a communication link to the KDC 306. The Krb5ClientSecurityHandler 312 creates a GSS wrapped security token by creating a GSS context and calling the context.initSecContext. The byte array returned from initSecContext is a Kerberos service ticket (Keberos application request or KRB_AP-REQ) enclosed in a GSS frame. An example follows:

```
GSSContext context = manager.createContext(serverName,
krb5Mechanism, null, GSSContext.DEFAULT_LIFETIME);
/* set desired context properties */
context.requestMutualAuth(false) ; // SWITCH OFF
byte[] inToken = new byte [0];
byte[] outToken = context.initSecContext(inToken, 0, inToken.length);
```

The security token cannot be sent in its initial form because it contains binary characters that cannot be represented in extended markup language (XML). So, the security token is converted to the multi-purpose Internet mail extension (MIME) type base64 binary encoding. The token is then added to the SOAP message header. The SOAP request, including the service ticket and the security token is then sent over the network 106 using hypertext transfer protocol (HTTP) to the web service 324 in the WLS 302. Exemplary embodiments of the present invention are not limited to using HTTP, any method known in the art may be utilized to transmit the service ticket and security token including, for example, issuing a SOAP request over JMS.

Referring back to FIG. 2, at block 208, the WLS receives the security token and service ticket. If it is determined, at block 209, that there is a Kerberos token in a SOAP header, then block 210 is performed. At block 210, WLS 302 authenticates the session and user using Kerberos. To perform the processing in blocks 208 through 210, the Krb5ServerSecurityHandler 316 intercepts the message from the client 304. A Kerberized web service has a Kerberos principal and credentials associated with it that are used during the authentication process to authenticate client requests. A Kerberos principal is associated with the particular web service by specifying the principal name in Weblogics web-services.xml deployment descriptor as a parameter to the Krb5ServerSecurityHandler 316. The following example shows the first few lines of a web-services.xml file.

```
<?xml version="1.0" encoding="us-ascii" ?>
<web-services>
<handler-chains>
    <handler-chain name="myChain">
<handler class name="com.bls.security.ws.Krb5ServerSecurityHandler">
<init-params>
<init-param name="ServicePrincipal"
    value=" mybilling@mykerberos.realm "/>
</init-params>
</handler>
</handler-chain>
</handler-chains>
etc..
```

When the Krb5ServerSecurityHandler 316 is initialized, the init method is called at which time the service principal is read from the web-services.xml file by calling handlerInfo. getHandlerConfigo.get("servicePrincipal"). The following example code shows retrieving servicePrincipal from the web-services.xml.

```
public void init(HandlerInfo handlerInfo) throws SOAPFaultException {
    this.handlerInfo = handlerInfo;
servicePrincipal = (String)this.handlerInfo.getHandlerConfig( ).get(
    "ServicePrincipal");
```

When an operation on the web service is invoked, the request is intercepted by the Krb5ServerSecurityHandler 316. The handleRequest method is invoked on the Krb5ServerSecurityHandler which attempts to extract the Kerberos service ticket from the SOAP header. If a session ticket is not present a security exception is raised and control returned to the client. If a session ticket is present, the assertidentity method with parameters servicePrincipal and the session ticket is invoked on the Krb5AuthEJB 318. The Krb5AuthEJB's ejb-jar.xml deployment descriptor enables the EJB to run as a privileged user, specifically a WLS a user with administration authority. This allows the EJB to call the privileged Weblogic security framework method assertIdentity. Following is an excerpt from EJB-xml showing how to enable bean to run as privileged user.

```
<ejb-jar>
<enterprise-beans>
<session>
<ejb-name>AuthenticatorEJB</ejb-name>
<home>com.bls.security.AuthenticatorHome</home>
<remote>com.bls.security.Authenticator</remote>
<ejb-class>com.bls.security.AuthenticatorEJB</ejb-class>
<session-type>Stateless</session-type>
<transaction-type>Container</transaction-type>
<security-identity>
<run-as>
<role-name>priv</role-name>
</run-as>
</security-identity>
</session>
</enterprise-beans>
<assembly-descriptor>
<security-role>
<role-name>priv</role-name>
</security-role>
```

Following is an excerpt from weblogic-ejb-jar.xml mapping role defined in ejb-jar.xml to a specific user with administrator rights in WLS.

```
<weblogic-ejb-jar>
<weblogic-enterprise-bean>
<ejb-name>AuthenticatorEJB</ejb-name>
<stateless-session-descriptor>
</stateless-session-descriptor>
<enable-call-by-reference>True</enable-call-by-reference>
<jndi-name>ejb.AuthenticatorEJBRemoteHome</jndi-name>
</weblogic-enterprise-bean>
<security-role-assignment>
<role-name>priv</role-name>
<principal-name>weblogic</principal-name>
</security-role-assignment>
</weblogic-ejb-jar>
```

The assertIdentity method in the Krb5SecurityHandler delegates the call to the Krb5AuthEJB.

```
private Subject assertIdentity(String servicePrincipal, byte[] token,
        NonCatalogLogger log) throws
javax.security.auth.login.LoginException, java.rmi.RemoteException {
Object obj[] = new Object[2];
obj[0] = servicePrincipal;
obj[1] = token;
Subject subject = authenticator.assertIdentity(TOKEN_TYPE, obj);
    return subject;
    }
```

If the call to the to KrbV5AuthEJB assertIdentity method was successful, i.e. the user is authenticated, the method will return a JAAS Subject, otherwise javax.security.auth.login.LoginException is thrown, which causes an error to be returned to the client. The Krb5ServerSecurityHandler 316 sets the JAAS subject in the message context. This may be accomplished with the following sample code:

```
WLMessageContext context = (WLMessageContext) mc;
context.setProperty
("_BEA_PRIVATE_AUTHETICATED_SUBJECT_PROP",
subject)
```

The deployment descriptors for the Krb5AuthEJB 318 cause the EJB to run as a Weblogic user with administrator rights when a method is invoked on it. This allows the EJB to execute the privileged method weblogic.security.services.Authentication.assertIdentity( ). The following code fragment shows an example of the implementation of the assertIdentity method on the Krb5AuthEJB.

```
public Subject assertIdentity(String tokenType, Object [] tokenValue)
throws
javax.security.auth.login.LoginException {
Subject subject =
weblogic.security.services.Authentication.assertIdentity(tokenType,token
Value);
return subject;
}
}
```

The call weblogic.security.services.Authentication.assertIdentity causes WLS 302 to search for an IdentityAsserter registered to handle the specified token type i.e. "kerberosV5ST"; in this case it will find the Krb5IdentityAsserter 308. The WLS security framework then forwards the request to the assertidentity( ) method on the specific identityAsserter. If successful, the weblogic security framework creates a JAAS subject and using callback methods in the identity asserter adds the JAAS principal containing the source name of the Kerberos service ticket. The JAAS Subject is returned in the response.

The Krb5IdentityAsserter 308 assertIdentity method is passed two parameters: security token type and an Object array containing two elements, a servicePrincipal and the security token value. The security token type is a string containing the value "KerberosV5ST." The servicePrincipal is a string representing the name of Kerberos principal the web service was registered with, for example, "mybilling@mykerberos.realm" the security token value is the security token passed from the client. The assertidentity method finds the GSS Credenitial for the service principal by searching the credential HashMap. An example code fragment follows.

```
// Find services credentials to use to authenticate this request
GSSCredential credential = (GSSCredential)
credentialMap.get(servicePrincipal);
A new GSS context is created with the credential.
GSSContext context = manager.createContext(credential);
```

Then, the GSS acceptSecContext( ) is called to validate the security token. Sample code is as follows.

```
//accept verifies the token is legit, otherwise throws a GSSException
byte[] outToken = context.acceptSecContext(tokenBytes, 0,
tokenBytes.length);
//extract the username from the token
String username = context.getSrcName( ).toString( );
log.debug("kerberosPrincipal (getSrcName( )) = + userName);
context.dispose( );
return new Krb5CallbackHandlerImpl(userName)
```

If it is determined, at block 211, that the session ticket is valid, block 212 is performed. At block 212 in FIG. 2, WLS 302 invokes the requested application. In an exemplary embodiment of the present invention, the weblogic.security-.Security.getCurrentSubject( ) is called to get the identity of the user invoking the operation.

Exemplary embodiments of the present invention are not limited specifically to WLS 8.1, but may also be implemented using WLS 7, 8. Further, the code samples contained herein are examples only, and as will be appreciated by those of ordinary skill in the art, there are many alternative code sequences that may be utilized to produce the same results.

In addition, exemplary embodiments of the present invention are not limited to web services. There is only one web service specific component, Krb5ServerSecurityHandler 316, which is responsible for extracting the security token from the SOAP header and forwarding it into the security framework for authentication. To expand the invention to other technologies, additional handlers may be written. For example, to secure servlets with Kerberos, a Krb5ServletFilter may be written, it function would be the same as the Krb5ServerSecurityHandler extract security token and forward to security framework. Another alternative use of exemplary embodiments of the present invention would be to authenticate Java message service (JMS) messages. The backend security components, i.e. the Krb5AuthEJB 318 and Krb5IdentityAsserter 308 remain unchanged.

The example described herein shows how authenticate requests issued from a Java client. Microsoft recently released Web Services Enhancement Pack 2.0 SP2 which provides a mechanism for attaching Kerberos session tickets to web service requests issued from the NET platform. A Krb5WSE2ServerSecurityHandler may be written to allow the Kerberos security token to be extracted and authenticated from the SOAP header issued from NET client requests.

Exemplary embodiments of the present invention utilize the Kerberos ticket to authenticate the client and not to provide message integrity or privacy. The GSS-API provides methods for message integrity and privacy (getMic/verifyMic and wrap/unwrap). Exemplary embodiments of the present invention may include providing message integrity and privacy by using the API's provided with the GSS-API, both from the client to the server and the server to the client.

As described above, providing Kerberos authentication in a WLS environment can allow a single security scheme, Kerberos, to be utilized by a client. This can prevent the client user from having to remember different passwords and logon processes for different applications.

As described above, embodiments may be in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, wherein, when the computer program code is loaded into and executed by a computer, the computer becomes an apparatus for practicing the invention. When implemented on a general-purpose microprocessor, the computer program code segments configure the microprocessor t° create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for providing authentication in a computer environment, the method comprising:
   receiving a request for a web service from a client, wherein the request is received at a J2EE based application server hosting one or more applications, the request includes a Kerberos security token and a Kerberos service ticket, and each application has its own Kerberos identity;
   verifying that the client has access to the web service using the Kerberos security token and Kerberos service ticket as input to the verifying; and
   providing the client a connection to the web service if the verifying results in a determination that the client has access to the web service;
   wherein the web service is hosted on a BEA WebLogic application server, the request is received at the BEA WebLogic application server;
   the BEA WebLogic application server detelmining if the request includes a generic security service (GSS) framed Kerberos application request in a simple object access protocol (SOAP) header; and
   wherein the BEA WebLogic application server returns a security exception if the Kerberos application request is not in the simple object access protocol (SOAP).

2. The method of claim 1 wherein the web service is accessed via a Microsoft.net client.

3. The method of claim 1 wherein the web service is accessed via a Java JAX-RPC client.

4. The method of claim 1 wherein the request is received by a Kerberos server security handler on the application server.

5. The method of claim 4 wherein the verifying includes the Kerberos server security handler authenticating the Kerberos security token and the Kerberos service ticket.

6. The method of claim 1 wherein the request is in a SOAP format.

7. A host system in communication with a network, the host system comprising:
   a J2EE based application server hosting one or more applications and including an input for receiving a request for a web service from a client, wherein the request includes a Kerberos security token and a Kerberos service ticket, and each application has its own Kerberos identity; and
   computer instructions for:
   verifying that the client has access to the web service using the Kerberos security token and Kerberos service ticket as input to the verifying; and
   providing the client a connection to the web service if the verifying results in a determination that the client has access to the web service.
   wherein the application server is a BEA WebLogic application logic server: the BEA WebLogic application server determining if the request includes a generic security service (GSS) framed Kerberos application request in a simple object access protocol (SOAP) header; and
   wherein the BEA WebLogic application server returns a security exception if the Kerberos application request is not in the simple object access protocol (SOAP).

8. The system of claim 7 wherein the network is the Internet.

9. The system of claim 7 wherein the web service is accessed via a Microsoft.net client.

10. The system of claim 7 wherein the web service is accessed via a Java JAX-RPC client.

11. The system of claim 7 wherein the request is received by a Kerberos server security handler on the application server.

12. The system of claim 11 wherein the verifying includes the Kerberos server security handler authenticating the Kerberos security token and the Kerberos service ticket.

13. The system of claim 7 wherein the request is in a SOAP format.

14. A computer program product for providing authentication in a computer environment, the computer program product comprising instructions embodied on a computer readable storage medium for execution by the processing circuit for facilitating a method comprising:
   receiving a request for a web service from a client, wherein the request is received at a J2EE based application server hosting one or more applications, the request includes a Kerberos security token and a Kerberos service ticket, and each application has its own Kerberos identity;
   verifying that the client has access to the web service using the Kerberos security token and Kerberos service ticket as input to the verifying; and
   providing the client a connection to the web service if the verifying results in a determination that the client has access to the web service;

15. The computer program product of claim 14 wherein the web service is accessed via a Microsoft.net client.

16. The computer program product of claim 14 wherein the web service is accessed via a Java JAX-RPC client.

* * * * *